United States Patent
Feng et al.

(10) Patent No.: US 8,576,594 B2
(45) Date of Patent: Nov. 5, 2013

(54) SOFT STARTER FOR PHASE-SHIFTING AUTOTRANSFORMER AC-DC POWER CONVERTER

(75) Inventors: Frank Z. Feng, Loves Park, IL (US); Barry John Parker, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 420 days.

(21) Appl. No.: 13/079,128

(22) Filed: Apr. 4, 2011

(65) Prior Publication Data

US 2012/0250376 A1 Oct. 4, 2012

(51) Int. Cl.
*H02M 7/217* (2006.01)
(52) U.S. Cl.
USPC ............. 363/89; 323/361; 323/908; 363/49; 363/92
(58) Field of Classification Search
USPC ......... 323/215, 305, 328, 345, 361, 901, 908; 363/49, 89, 90, 91, 92
See application file for complete search history.

(56) References Cited

U.S. PATENT DOCUMENTS

| | | | |
|---|---|---|---|
| 4,719,553 A | * | 1/1988 | Hinckley .................. 363/49 |
| 4,862,342 A | | 8/1989 | Dhyanchand et al. |
| 4,866,591 A | | 9/1989 | Cook et al. |
| 5,015,941 A | | 5/1991 | Dhyanchand |
| 5,619,407 A | | 4/1997 | Hammond |
| 6,118,362 A | | 9/2000 | Tinkler et al. |
| 6,404,176 B1 | | 6/2002 | Winick et al. |
| 6,674,654 B2 | | 1/2004 | Winick et al. |
| 7,638,890 B2 | | 12/2009 | Lando et al. |
| 7,813,147 B2 | | 10/2010 | Blanchery |
| 7,898,829 B2 | | 3/2011 | Oguchi et al. |
| 2012/0250376 A1 | * | 10/2012 | Feng et al. .................. 363/49 |

* cited by examiner

*Primary Examiner* — Jeffrey Sterrett
(74) *Attorney, Agent, or Firm* — Carlson, Gaskey & Olds P.C.

(57) ABSTRACT

An AC-DC power converter has a phase-shifting autotransformer based rectifiers and DC capacitors. Soft start of the AC-DC power converter is achieved by designing the autotransformer to operate at a low peak flux density at a point of AC voltage step application (initial turn on). The addition of a controlled impedance segregates capacitor charging from the initial magnetizing process of the autotransformer.

13 Claims, 3 Drawing Sheets

# SOFT STARTER FOR PHASE-SHIFTING AUTOTRANSFORMER AC-DC POWER CONVERTER

BACKGROUND

The present disclosure relates to AC-DC converters incorporating a phase-shifting autotransformer for AC input power factor correction.

Electric aircraft often includes three-phase power generators, which are used to generate the power needed to operate on-board electronic systems during flight. The three phase power from the generators is converted to DC power using an AC-DC converter. One type of AC-DC converter used in aircraft systems is a phase-shifting autotransformer with integrated rectifiers.

Phase-shifting autotransformer-based AC-DC converter systems require a large initial input of energy (referred to as an inrush current) on startup when a zero voltage to rated AC voltage step is applied in order to magnetize the phase-shifting autotransformer and charge a DC capacitor. Due to the initial inrush requirement, as much as 10 times the rated working current of the AC-DC converter can be drawn from the AC power connections.

SUMMARY

Disclosed is an AC-DC converter that includes a phase-shifting autotransformer module having an AC power input and a DC power output, a capacitor connected across the DC power output, and a controlled impedance component interrupting the DC power output, such that the autotransformer magnetization current is segregated from the capacitor charging current.

Also disclosed is a method for operating a phase-shifting autotransformer based AC-DC converter. The method includes segregating phase-shifting autotransformer initial magnetizing and DC capacitor charging to control inrush current drawn from an AC source, by way of a controlled impedance component. The controlled impedance component is in an off mode when the AC step voltage is applied, the controlled impedance component allows the autotransformer to establish an initial magnetization without charging the capacitor. After autotransformer initial magnetization, the controlled impedance component is in a high impedance mode thereby establishing capacitor slow charging. The controlled impedance component is in an on mode after the capacitor is charged up, thereby establishing a steady state operation mode.

These and other features of the present invention can be best understood from the following specification and drawings, the following of which is a brief description.

DETAILED DESCRIPTION

Figure 1:
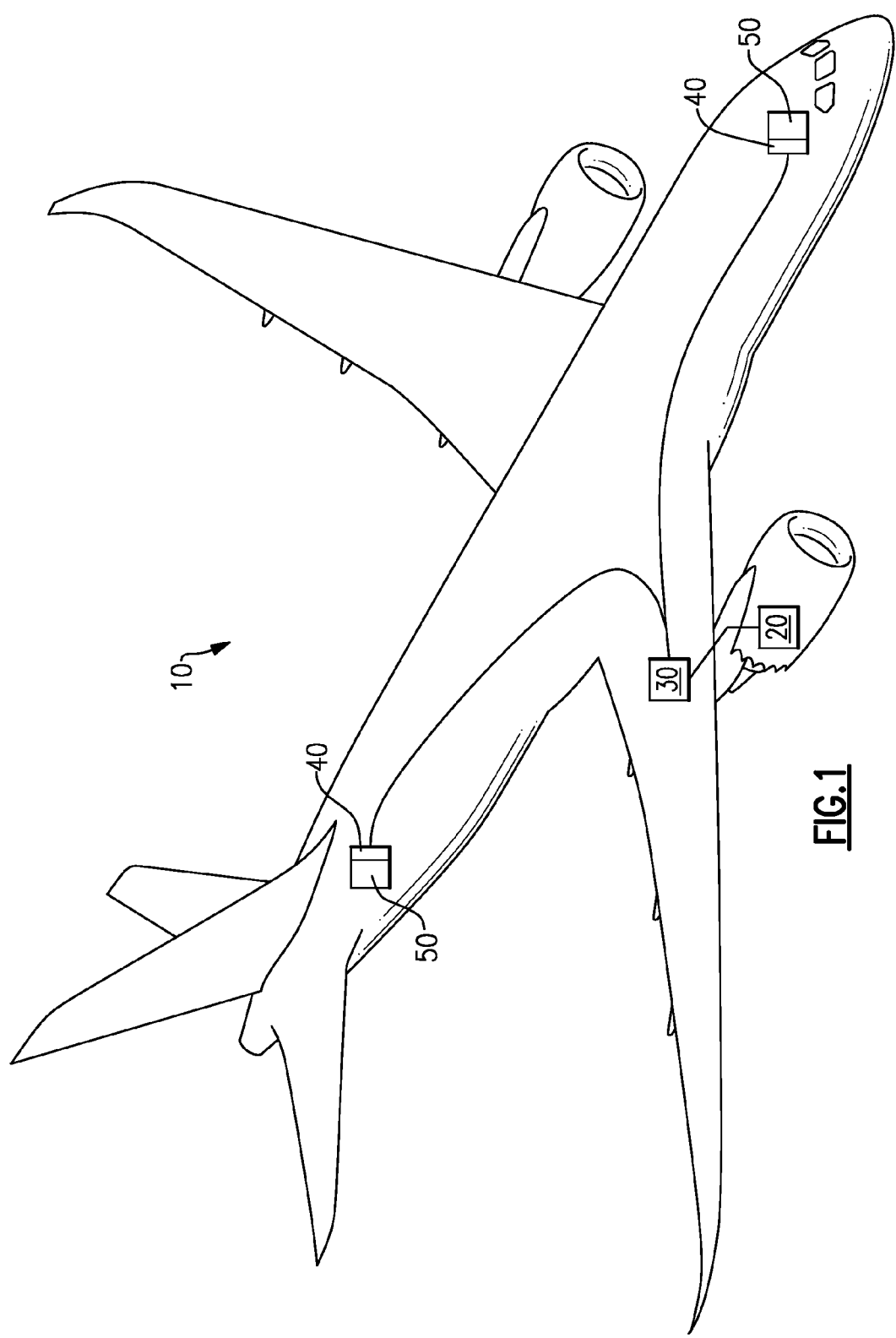
FIG. 1 illustrates an electric aircraft power system.

FIG. 1 illustrates an electric aircraft 10 that includes a three phase power generator 20. The generated three phase power is distributed throughout the aircraft 10 via a power distribution system 30. A phase-shifting autotransformer based AC-DC power converter 40 converts AC power from the power distribution system 30 into DC power for use with the DC components 50.

Figure 2:
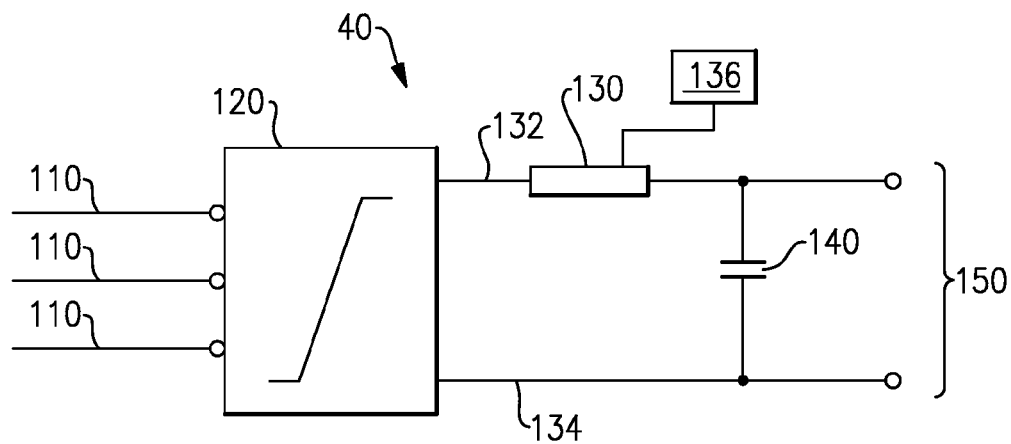
FIG. 2 illustrates a phase-shifting autotransformer based AC-DC converter.

FIG. 2 illustrates an example phase-shifting autotransformer based AC-DC power converter 40. In the example phase-shifting autotransformer based AC-DC power converter 40, three phase power 110 is input into a phase-shifting autotransformer based rectifier 120. DC power is output from the phase-shifting autotransformer based rectifier 120 on a pair of DC outputs 132, 134. One of the DC outputs 132 is interrupted by a controlled impedance component 130, such as a semi-conductor switch/transistor, that can be operated in an off mode (open circuit), a high impedance mode, or an on mode.

The high impedance mode limits a capacitor charging current provided to the capacitor 140. A controller 136 controls the mode of the controlled impedance component 130. By way of example, the controlled impedance component 130 can be a semi-conductor switch controlled by the controller 136.

When the phase-shifting autotransformer based AC-DC power converter 40 is initially powered up, the controlled impedance component 130 is in the off mode, thereby preventing any power from passing to the capacitor 140 or the DC load connection 150. While the controlled impedance component 130 is in the off mode, a zero AC voltage to rated AC voltage step is applied to the phase-shifting autotransformer based rectifier 120, a startup current is drawn from the three phase power 110 and magnetizes the autotransformer portion of the phase-shifting autotransformer based rectifier 120, thereby establishing transformer flux in the core 320, illustrated in FIG. 3, of the autotransformer portion of the phase-shifting autotransformer based rectifier 120.

Figure 3:
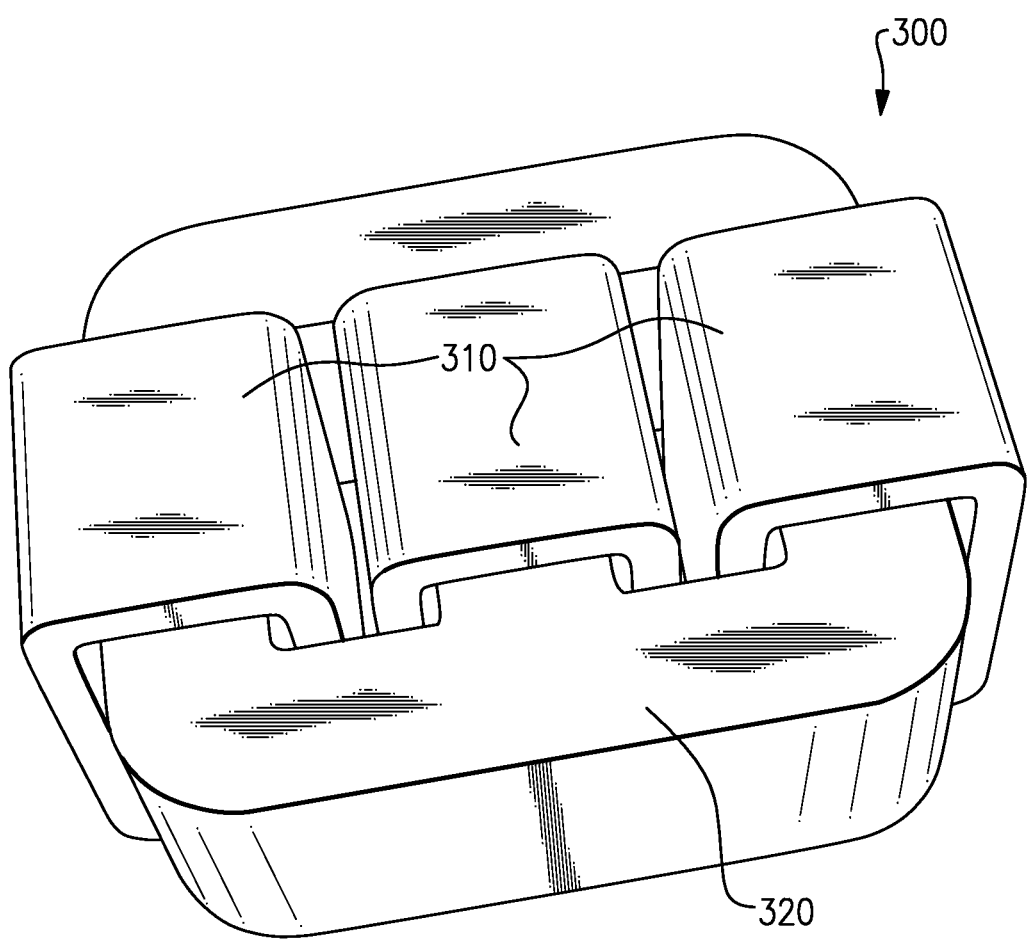
FIG. 3 illustrates an exemplary autotransformer.

FIG. 3 illustrates a phase shifting autotransformer 300 usable in the power converter 40, having a core 320 about which a set of phase windings 310 are wound. In order to function, a transformer flux is established in the core 320 via the use of magnetization current provided to the windings 310 according to known principles. The initial flux generated when the autotransformer 300 is turned on is referred to as a startup flux.

The startup flux density within the autotransformer portion of the phase-shifting autotransformer based rectifier 120 peaks at a high value before declining to a steady state flux density after the autotransformer core is fully magnetized. Startup current from three phase power 110 peaks at high value before settling to steady state. Such current is referred to as inrush current. Once the autotransformer portion of the phase-shifting autotransformer based rectifier 120 is fully magnetized, the controller 136 switches the controlled impedance component 130 into the high impedance mode, thereby slowly charging the capacitor 140.

When the capacitor 140 is charged, the controller 136 switches the controlled impedance component 130 into the on mode, and rectified power is allowed to pass through the DC load connection 150 into an attached load. An inrush current exceeding the rated current of the AC-DC converter is referred to as a hard start, and causes instability and stress within the aircraft electrical system. In contrast, an inrush current that is less than a full rated AC input current is referred to as soft start. Additional power converters 40 in the power system simultaneously undergoing a hard start compound the stresses resulting from hard start inrush currents.

In order to allow the above described "soft start" performance, the magnetization of the autotransformer portion of the phase-shifting autotransformer based rectifier 120 is designed to have a peak startup flux that falls within either a linear region or a shallow saturation region of the magnetization curve.

Figure 4:
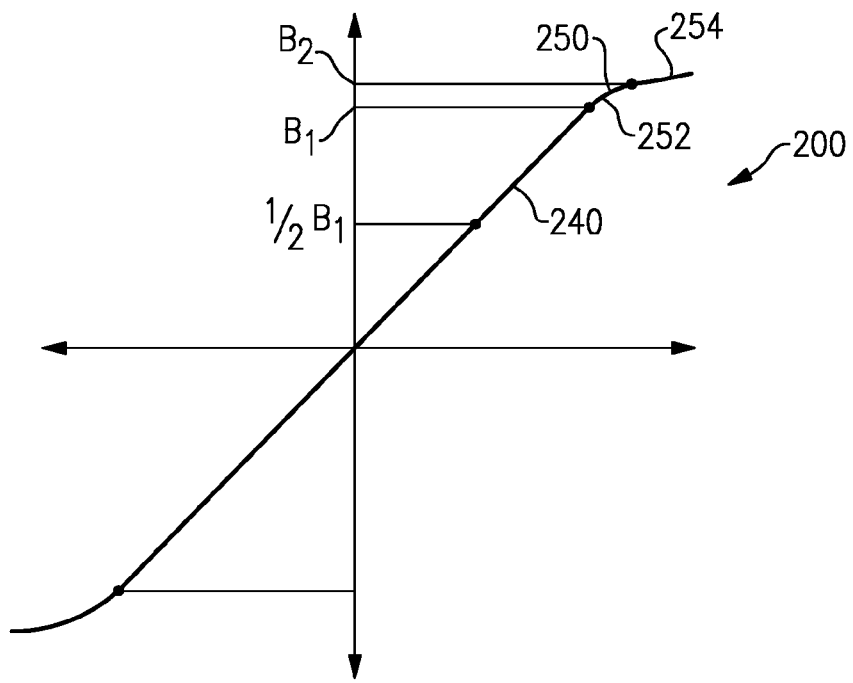
FIG. 4 illustrates an example autotransformer magnetization curve.

FIG. 4 illustrates a magnetization curve 200 of an example autotransformer. The magnetization curve 200 includes a linear region 240 and a saturation region 250. The saturation region 250 is broken into two sub regions, a shallow saturation region 252 (between B1 and B2) and a deep saturation region 254 (above B2). In one example autotransformer design, the autotransformer core flux density falls entirely within the linear region 240. As a result, the peak flux density during startup is less than B1, where B1 is the transition point between the linear region 240 and the saturation region 250.

In the above example, the autotransformer typically draws a steady state magnetization current ($I_{mag}$) of <10% of a full rated AC input current in order to maintain autotransformer magnetization during steady state operations. The magnetization current is drawn from the three phase power 110. During the initial startup of the autotransformer system 40, the inrush current is $2 \times I_{mag}$ or <20% of the full rated AC input current and lasts for three times the autotransformer magnetization inductance time constant ($\tau$). The initial current of $2 \times I_{mag}$ results in an autotransformer flux density that is near, but under, B1. Thus, the peak startup flux density falls within the linear region 240. The magnetization inductance time constant is $\tau=L/R$, where L is the autotransformer inductance and R is the autotransformer magnetizing winding resistance. After $3\tau$, the autotransformer flux density reduces to ½ B1, where it stays steady during high impedance mode and on mode operations. An autotransformer designed according to the above principles can be large and, thus, unsuitable for certain applications.

Alternately, the autotransformer can be designed such that the peak startup flux falls in a shallow saturation region 252 between B2 and B1. In such a design, the inrush current can vary from $2 \times I_{mag}$ to the full rated AC input current, and is a function of the peak flux density during the startup. An increase in initial flux density increases the current draw. The shallow saturation region 252 prevents the inrush current from reaching levels that exceed the rated current of the autotransformer, thereby avoiding a hard start. Designing the autotransformer such that the peak startup flux density is in the shallow saturation region 252 provides for a soft start performance and reduces the physical size of the autotransformer.

Although an example has been disclosed, a worker of ordinary skill in this art would recognize that certain modifications would come within the scope of this disclosure. For that reason, the following claims should be studied to determine the true scope and content of this disclosure.

What is claimed is:

1. An AC-DC converter comprising:
    a phase-shifting autotransformer and rectifier module having an AC power input and a DC power output;
    a capacitor connected across said DC power output; and
    a controlled impedance component interrupting said DC power output, such that an autotransformer magnetization current is segregated from a capacitor charge current.

2. The AC-DC converter of claim 1, wherein said controlled impedance component has at least an off mode, a high impedance mode, and an on mode.

3. The AC-DC converter of claim 1, wherein said controlled impedance component is a semi-conductor transistor.

4. The AC-DC converter of claim 1, further comprising a controller, electrically coupled to said controlled impedance component.

5. The AC-DC converter of claim 1, wherein a magnetic flux density of the phase-shifting autotransformer has a peak start up flux density in a linear region of an autotransformer magnetization curve of said phase-shifting autotransformer.

6. The AC-DC converter of claim 1, wherein a magnetic flux density of the phase-shifting autotransformer has a peak start up flux density in a shallow saturation region of an autotransformer magnetization curve.

7. A method for operating an autotransformer-based AC-DC converter, comprising the steps of:
    controlling a controlled impedance component to be in an off mode thereby establishing an initial magnetization period having a magnetizing inrush current;
    controlling said controlled impedance component in a high impedance mode thereby establishing a capacitor charging period having a capacitor charging inrush current; and
    controlling said controlled impedance component to be in an on mode, thereby establishing a steady state operation mode.

8. The method of claim 7, wherein a peak startup flux density during said initial magnetization period is in a shallow saturation region of a magnetization curve for said autotransformer.

9. The method of claim 7, wherein a peak inrush current of said autotransformer-based AC-DC converter is less than a full rated AC input current of said autotransformer-based rectifier.

10. The method of claim 7, wherein said autotransformer draws a magnetization current of less than 10% of an autotransformer full rated AC input current during normal operations.

11. The method of claim 7, wherein a peak startup flux density of said autotransformer during said initial magnetization period falls within a linear region of a magnetization curve of said autotransformer.

12. The method of claim 7, wherein said autotransformer has a flux density of one half the maximum flux density of the linear region during normal operations.

13. The method of claim 7, wherein a peak magnetization current during said initial magnetization period is approximately twice a peak magnetization current of said autotransformer during normal operation.

* * * * *